(12) United States Patent
Sturza et al.

(10) Patent No.: US 11,548,352 B2
(45) Date of Patent: Jan. 10, 2023

(54) INTERIOR TRIM STORAGE BIN/TRAY WITH INTEGRATED EXHAUSTER PATH

(71) Applicants: Brian P Sturza, Washington, MI (US); Joseph V Rozenbaum, Ortonville, MI (US)

(72) Inventors: Brian P Sturza, Washington, MI (US); Joseph V Rozenbaum, Ortonville, MI (US)

(73) Assignee: FCA US LLC, Auburn Hills, MI (US)

( * ) Notice: Subject to any disclaimer, the term of this patent is extended or adjusted under 35 U.S.C. 154(b) by 745 days.

(21) Appl. No.: 16/158,518

(22) Filed: Oct. 12, 2018

(65) Prior Publication Data
US 2020/0114731 A1    Apr. 16, 2020

(51) Int. Cl.
| B60H 1/00 | (2006.01) |
| B60H 1/24 | (2006.01) |
| B60R 7/04 | (2006.01) |
| B60R 7/02 | (2006.01) |

(52) U.S. Cl.
CPC ......... *B60H 1/246* (2013.01); *B60H 1/00564* (2013.01); *B60H 1/248* (2013.01); *B60R 7/02* (2013.01); *B60R 7/04* (2013.01); *B60Y 2200/141* (2013.01)

(58) Field of Classification Search
CPC ........... B60R 7/02; B60R 7/04; B60R 21/207; B60R 21/239; B60H 1/00271; B60H 1/00295; B60H 1/00378; B60H 1/00564; B60H 1/00592; B60H 1/24; B60H 1/246; B60H 1/248; B60H 1/243; B60Y 2200/141
USPC ....................................................... 454/162
See application file for complete search history.

(56) References Cited

U.S. PATENT DOCUMENTS

| 2,241,755 | A | * | 5/1941 | Zaccone | ................ | B62D 35/00 |
| | | | | | | 454/120 |
| 3,236,169 | A | * | 2/1966 | Starnaman | ............. | B60H 1/248 |
| | | | | | | 454/165 |
| 3,356,409 | A | * | 12/1967 | Belsky | ................... | B60N 2/793 |
| | | | | | | 296/24.34 |
| 4,304,314 | A | * | 12/1981 | Sakaguchi | ............... | B60N 2/00 |
| | | | | | | 180/68.2 |

(Continued)

FOREIGN PATENT DOCUMENTS

| DE | 102007008112 A1 | * | 8/2008 | ......... B60H 1/00428 |
| JP | 2007196911 A | | 8/2007 | |

(Continued)

OTHER PUBLICATIONS

Machine Translation of Pfalzgraf et al. (Year: 2008).*
Machine Translation of Takizawa (JP 2014034274 A) (Year: 2014).*

*Primary Examiner* — Avinash A Savani
*Assistant Examiner* — Ryan L Faulkner
(74) *Attorney, Agent, or Firm* — Ralph E. Smith

(57) ABSTRACT

A vehicle has a storage bin positioned between the seat and the rear wall of an interior compartment. The storage bin includes a receiving portion and louvered portion. The receiving portion is defined by a peripheral wall and a bottom. The louvered portion is coupled with the receiving portion. The louvered portion includes at least one window. An air flow path is defined by the storage bin. The air flow path enables air to pass into and through the at least one window under the receiving portion bottom and out through an exhaust vent in the rear wall.

11 Claims, 3 Drawing Sheets

(56) References Cited

U.S. PATENT DOCUMENTS

| | | | |
|---|---|---|---|
| 4,376,408 A * | 3/1983 | Iijima | B60H 1/00207 454/140 |
| 6,152,522 A * | 11/2000 | Boulay | B60H 1/247 296/208 |
| 6,315,069 B1 | 11/2001 | Suba et al. | |
| 6,902,020 B2 | 6/2005 | Kronner et al. | |
| 6,978,855 B2 | 12/2005 | Kubota et al. | |
| 7,004,274 B2 | 2/2006 | Shibasawa et al. | |
| 7,079,379 B2 | 7/2006 | Yamaguchi et al. | |
| 7,350,681 B2 * | 4/2008 | Polburn | B60R 7/005 296/37.16 |
| 7,396,062 B2 * | 7/2008 | Hung | B60H 1/00564 296/24.34 |
| 7,654,351 B2 * | 2/2010 | Koike | B60L 50/66 180/68.5 |
| 7,688,582 B2 | 3/2010 | Fukazu et al. | |
| 7,866,722 B2 * | 1/2011 | Shibata | B60N 3/104 296/24.34 |
| 8,118,354 B2 | 2/2012 | Lucas | |
| 8,251,169 B2 | 8/2012 | Fujiwara | |
| 8,272,685 B2 | 9/2012 | Lucas et al. | |
| 8,446,035 B2 | 5/2013 | Tsuchiya et al. | |
| 8,556,017 B2 | 10/2013 | Kubota et al. | |
| 9,180,773 B2 | 11/2015 | Honda et al. | |
| 9,343,785 B2 * | 5/2016 | Bito | H01M 10/613 |
| 2004/0041431 A1 * | 3/2004 | Ito | B60N 2/3013 296/65.05 |
| 2008/0296075 A1 * | 12/2008 | Zhu | B60N 2/5621 180/68.1 |
| 2009/0318068 A1 * | 12/2009 | Iida | B60H 1/00742 454/75 |
| 2010/0099019 A1 | 4/2010 | Nagata et al. | |
| 2012/0318591 A1 * | 12/2012 | Lim | B60K 1/04 180/65.31 |
| 2014/0302362 A1 * | 10/2014 | Takizawa | B60K 1/04 429/83 |
| 2015/0343891 A1 * | 12/2015 | Honda | H01M 10/6566 180/68.1 |
| 2019/0105966 A1 * | 4/2019 | Roesemann | B60H 1/244 |

FOREIGN PATENT DOCUMENTS

| | | | |
|---|---|---|---|
| JP | 2010-149647 A | 7/2010 | |
| JP | 2011057191 A | 3/2011 | |
| JP | 2014034274 A * | 2/2014 | B60K 11/06 |

* cited by examiner

INTERIOR TRIM STORAGE BIN/TRAY WITH INTEGRATED EXHAUSTER PATH

FIELD

The present disclosure relates to vehicle storage and, more particularly, to behind the seat storage bin with an integrated exhauster path.

BACKGROUND

In a vehicle interior compartment, it is desirable to have maximum storage. In order to optimize storage, designers utilize spaces in the entire compartment. In the rear wall of a vehicle, it is difficult to provide storage due to the fact that exhaust vents or the like are present. The exhauster and exhaust vents are part of the HVAC system. They are required so that air can pass out of the interior compartment of the vehicle to ambient to ventilate the vehicle. Also, the exhausters and vents assist in the door closing efforts. Thus, storage bins or the like have not been provided to avoid exhauster and vent blockage.

The present disclosure provides the art with a storage bin positioned adjacent the rear wall of the vehicle. The storage bin provides an integrated exhauster path to exhaust air in the interior compartment to the ambient outside. The present disclosure enables enhanced door closing by providing the exhauster path. Further, the present disclosure enables the seat back to be locked in position while having the storage container between the seat back and the rear wall.

SUMMARY

According to the present disclosure, a vehicle comprises an interior sitting compartment with at least one seat having a retractable back adjacent to a rear wall of the interior sitting compartment. The rear wall includes an exhaust vent to vent air from the sitting compartment to the outside. A storage bin is positioned between the seat and the rear wall. The storage bin includes a receiving portion to house items to be stored. The receiving portion is defined by a peripheral wall and a bottom. A louvered portion is coupled with the receiving portion. The louvered portion includes at least one window. An air flow path enables air to pass into and through the at least one window, under the receiving portion bottom and out through the exhaust vent in the rear wall of the vehicle interior sitting compartment. The air flow path is a tortuous path. Additional, storage containers can be mounted to the rear wall. The louver portion includes a plurality of windows. The interior storage includes a plurality of receiving portions. The louver portion includes a wall with the at least one window. The wall is spaced from the receiving portion peripheral wall to form a gap to enable air flow through the at least one window. The louver portion wall further includes a flange to contact a floor of the sitting compartment. The flange extends beyond the bottom of the receiving portion to provide the air flow path under the bottom of the receiving portion.

According to a second embodiment of the disclosure, a storage tray or bin for positioning between a seat and a rear wall of a vehicle includes a receiving portion to house items to be stored. The receiving portion is defined by a peripheral wall and a bottom. A louvered portion is coupled with the receiving portion. The louvered portion includes at least one window. An air flow path enables air to pass into and through the at least one window, under the receiving portion bottom and out through an exhaust vent in the rear wall of the interior vehicle compartment. The air flow path is a tortuous path. The louver portion includes a plurality of windows. The storage bin includes a plurality of receiving portions. The louver portion includes a wall with the at least one window. The wall is spaced from the receiving portion peripheral wall to form a gap. The gap enables air to flow through the at least one window. The louver portion wall further includes a flange to contact a floor of the interior sitting compartment. The flange extends beyond the bottom of the receiving portion to provide the air flow path under the bottom of the receiving portion.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
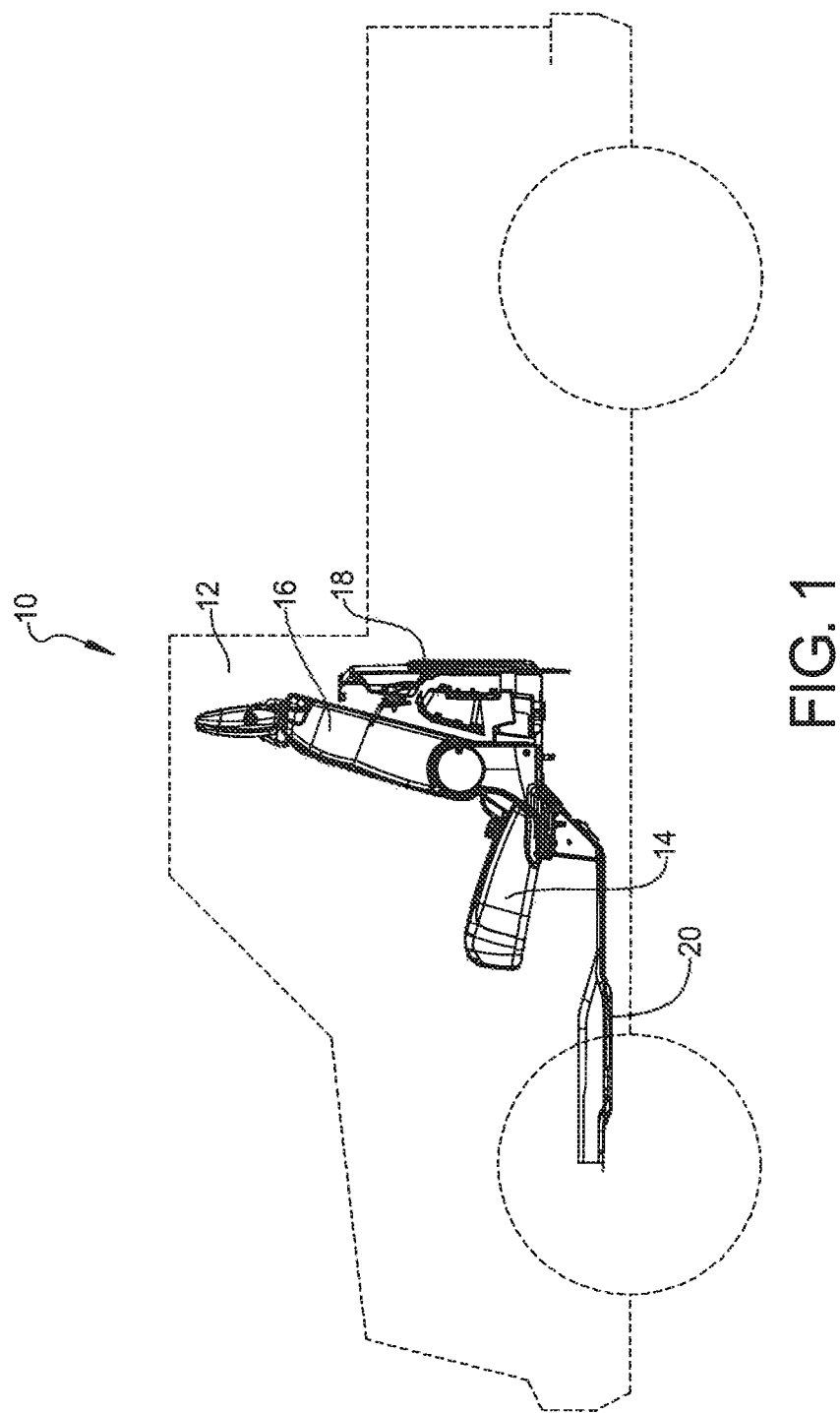
FIG. 1 is a side elevation view of a vehicle in accordance with the disclosure.

Turning to the drawings, a vehicle is illustrated with the reference numeral 10. The vehicle is illustrated as a truck. The vehicle 10 includes an interior compartment 12. The interior compartment 12 includes a seat 14 with a retractable seatback 16. The vehicle compartment 12 includes a rear wall 18 as well as a floorboard 20. The seat 14 is positioned in the vehicle such that the seatback 16 is adjacent the rear wall 18 of the interior compartment 12.

Figure 2:
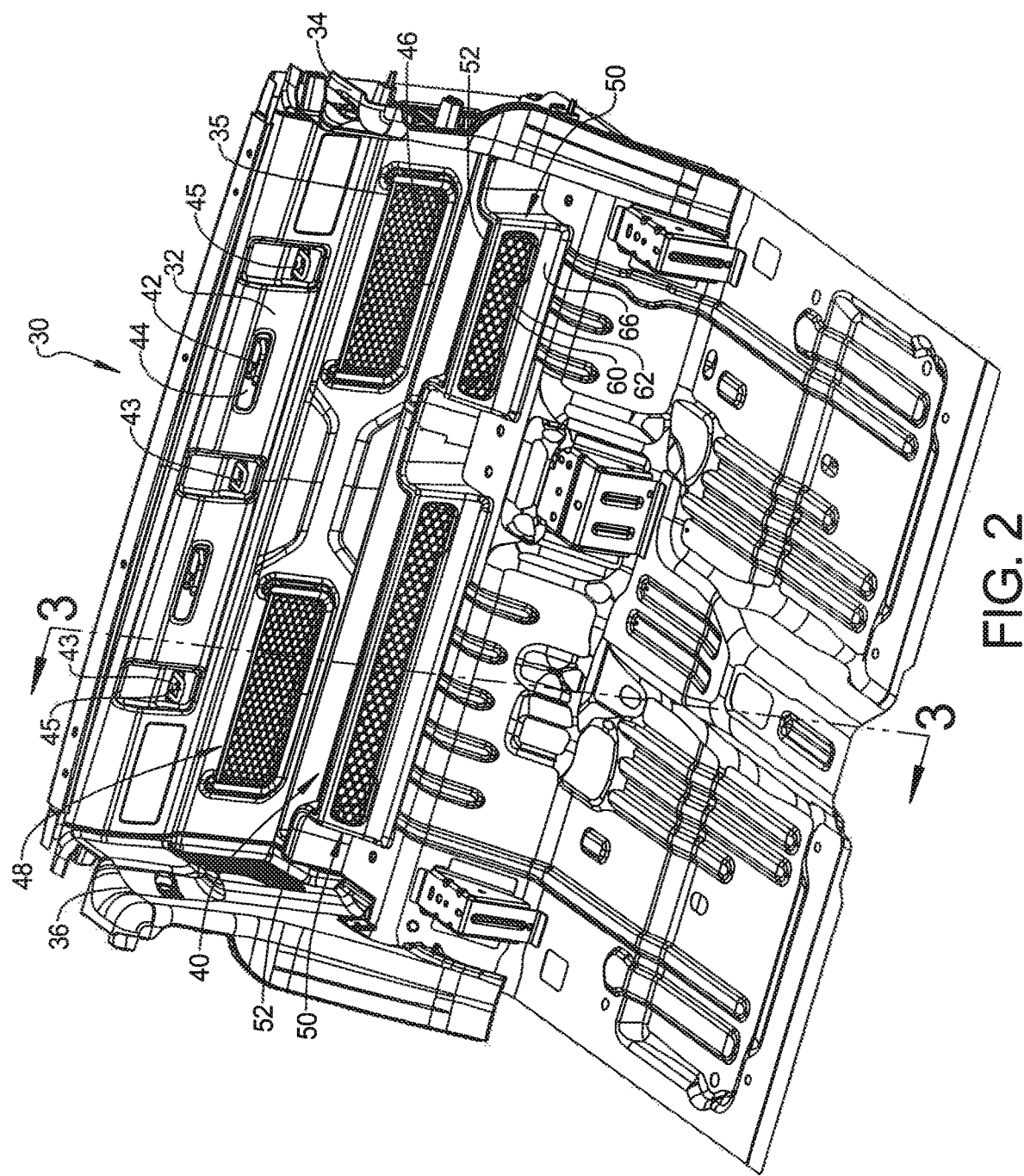
FIG. 2 is a perspective view of an interior compartment with the seat removed.

FIG. 2 illustrates an interior trim panel 30 positioned behind the seat 14. The panel 30 is mounted to the rear wall 18. The panel 30 includes a back 32 and sides 34, 36. The sides 34, 36 cover a portion of sidewalls of the interior compartment 12. Also, a storage tray or bin 40 is formed with the panel 30. The back 32 includes apertures 44, 45 that enable passage of securement members 42, 43 that receive the seatback 16. Also, the back 32 includes at least one, illustrated as two, indented portions 35. The indented portions 35 are opposed by a net 46 to provide additional storage containers 48 for the trim panel 30. Further, alternate methods besides nets, such as storage bins, map pockets, or the like may be formed from plastic and heatstaked welded to the panel.

The storage portion 40 includes at least one, illustrated with two, receiving portions 50. The receiving portions 50 are boxed shape and are defined by a peripheral wall 52. The receiving portions 50 include a bottom or floor 54 that defines the base of each storage receiving portion 50. The storage receiving portions 50 have an open top to enable items to be stored to be positioned into the receiving portions 50.

A louvered wall 60 is formed in front of and with the receiving portion 50. The louvered wall 60 includes at least one, preferably a plurality, of windows 62. The windows 62 enable air to pass through the wall 60. The louvered wall 60 is spaced from the peripheral wall 52 to provide a gap 64 between the two. The louvered wall 60 is positioned on a desired angle with respect to the peripheral wall 52. The louvered wall 60 includes a flange 66 with a downturn end 68. The flange 66 provides a step and enables the downturn ends 68 to be positioned against the floorboard 20 of the vehicle. The flange 66 increases rigidity and creates a bite into the carpet on the floorboard 20. The receiving portion bottom 54 is positioned in a plane above the plane of the floorboard 20 that is contacted by the downturn end 68. The stand offs 67, 69 on the bottom of the storage receiving portion 50 create the air flow path 70 on the bottom underside. This enables airflow through the louvered wall 60 and under the bottom 54. Thus, the flow path gap 70 is created between the underside of the bottom 54 and the surface of the floorboard 20. This enables the air to pass under the bottom 54 to rear wall 18.

The louvered wall 60 creates a blockade to secure items stored in the receiving portion 50 from theft. The louvered wall 60 blocks access to the items in the receiving portion 50 when the seat 14 is in the stowed or the up position.

The rear wall 18 includes a vent 72 to enable the air within the interior compartment 12 to pass and exit the vehicle. The flow path 70 between the bottom 54 and the floorboard 20 is sized so that air in the compartment can readily exit the vent 72 to enhance the closing of the vehicle doors. It has been found that a gap from 15 to 30 mm provides such a feature.

Figure 3:
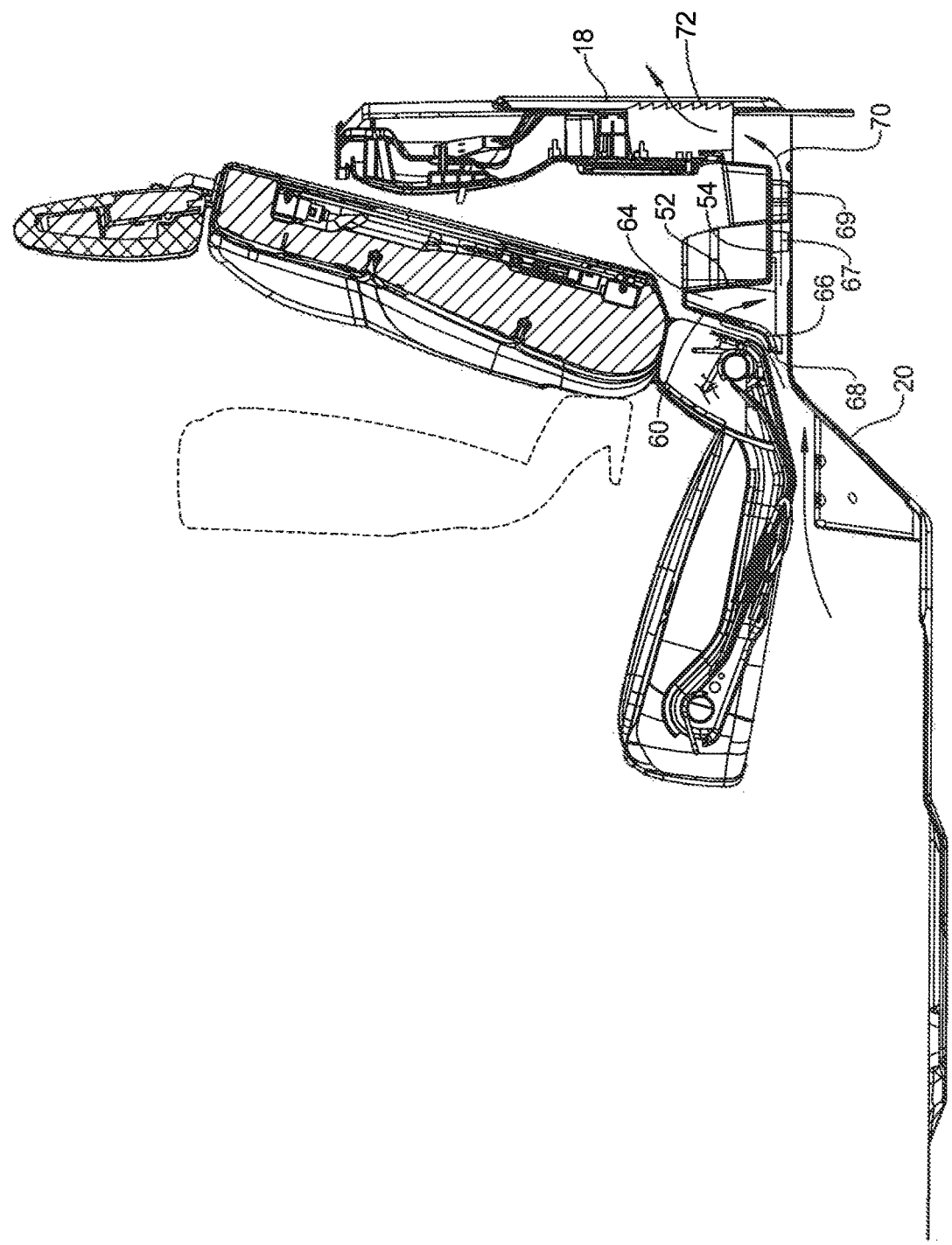
FIG. 3 is a cross-section view of FIG. 2 along line 3-3 with the seat in cross-section.

As can be seen in FIG. 3, air flows through the windows 62 and under the bottom 54 and then up along the back 32 to exit the exhaust 72. This tortuous path provides desired airflow characteristics.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle comprising:

a sitting compartment with a floorboard and a seat having a back adjacent a rear wall of the sitting compartment, a gap that defines an inlet of an airflow path being present between the seat and the floorboard, and the rear wall including an exhaust vent of the airflow path to vent the sitting compartment to the outside; and a storage bin positioned between the seat and the rear wall, the storage bin having a back that is mounted to the rear wall and including a receiving portion and a louvered wall, wherein the receiving portion is configured to house items to be stored and is defined by a peripheral wall that extends outward from the back of the storage bin and faces the back of the seat and a bottom connected to the peripheral wall that extends from the peripheral wall in a direction back toward the back of the storage bin to define a base of the receiving portion, the bottom of the receiving portion being positioned in a plane above and spaced apart from a plane defined by the floorboard; and the louvered wall includes a proximate portion coupled to an upper section of the peripheral wall of the receiving portion and a distal portion that defines a flange that is configured to contact the floorboard of the sitting compartment, the louvered wall being oriented to extend away from the peripheral wall such that a space is positioned between the louvered wall and the peripheral wall, the louvered wall including at least one opening between the proximate portion and the distal portion that permits air from the inlet of the airflow path to pass therethrough and enter the space between the louvered wall and the peripheral wall before being directed by the peripheral wall towards the plane defined by the floorboard such that the air flows between the bottom of the receiving portion and the floorboard before exiting the exhaust vent.

2. The vehicle of claim 1, wherein the air flow path is a tortuous path.

3. The vehicle of claim 1, further comprising a storage container mounted to the back of the storage bin.

4. The vehicle of claim 1, wherein the louvered wall includes a plurality of the openings.

5. The vehicle of claim 1, wherein the storage bin includes a plurality of the receiving portions.

6. The vehicle of claim 1, wherein the flange extends beyond the bottom of the receiving portion to provide the air flow path under the bottom.

7. A storage bin configured to be positioned in a space defined by a seat, a floorboard of a vehicle, and a rear wall of the vehicle, the floorboard being separated from the seat by a gap, the storage bin comprising:

a back that is configured to be mounted to the rear wall of the vehicle, the back including a receiving portion and a louvered wall, the receiving portion being configured to house items to be stored and defined by a peripheral wall that extends outward from the back and is configured to face the seat of the vehicle and a bottom connected to the peripheral wall that extends from the peripheral wall of the receiving portion in a direction back toward the back to define a base of the receiving portion, the bottom configured to be positioned in a plane above and spaced apart from a plane defined by the floorboard;

the louvered wall includes a proximate portion coupled to an upper section of the peripheral wall of the receiving portion and a distal portion that defines a flange that is configured to contact the floorboard of the vehicle, the louvered wall being oriented to extend away from the peripheral wall such that a space is positioned between the louvered wall and the peripheral wall of the receiving portion, the louvered wall defining at least one opening between the proximate portion and the distal portion that is configured to receive airflow from the gap between the seat and the floorboard; and the space defining an air flow path between the louvered wall portion and the peripheral wall of the receiving portion that is configured for receiving the airflow from the opening, wherein the space that defines the airflow path is configured to receive air from the at least one opening from the gap, and the peripheral wall is configured to direct air received by the space towards the plane defined by the floorboard such that the air flows between the bottom of the receiving portion and the floorboard before exiting an exhaust vent formed in the rear wall.

8. The storage bin of claim 7, wherein the air flow path is a tortuous path.

9. The storage bin of claim 7, wherein the louvered wall includes a plurality of the openings.

10. The storage bin of claim 7, wherein the bin includes a plurality of the receiving portions.

11. The storage bin of claim 7, wherein the flange extends beyond the bottom of the receiving portion to provide the air flow path under the bottom.

\* \* \* \* \*